May 9, 1967

E. E. HESTON ETAL 3,317,957

PELLETIZER

Filed June 11, 1965

INVENTORS.
EUGENE E. HESTON
WALDEMAR E. KMENTT
HAROLD J. ROBINS
JOHN F. STROUP

BY

Oberlin, Maky & Donnelly
ATTORNEYS

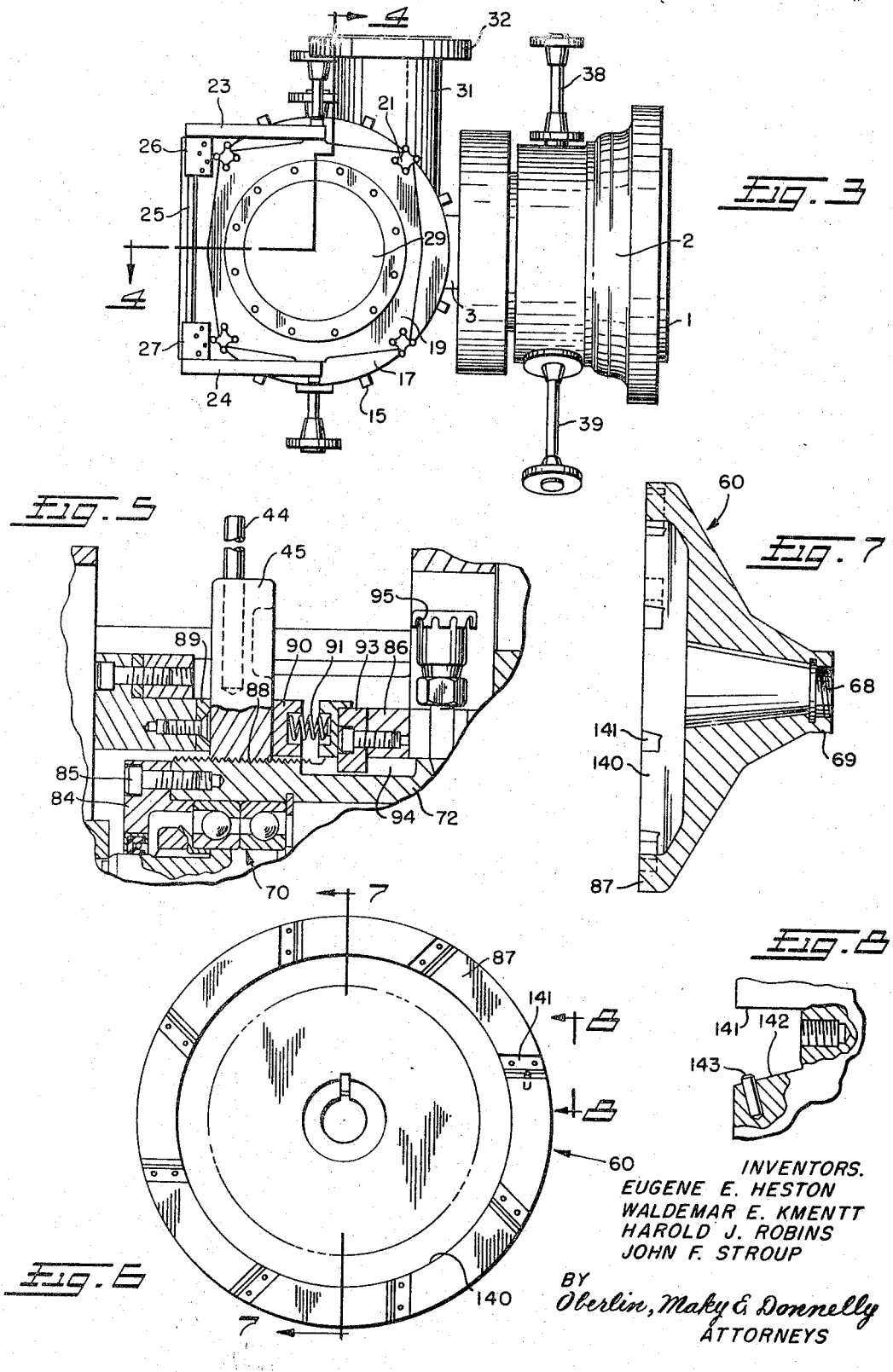

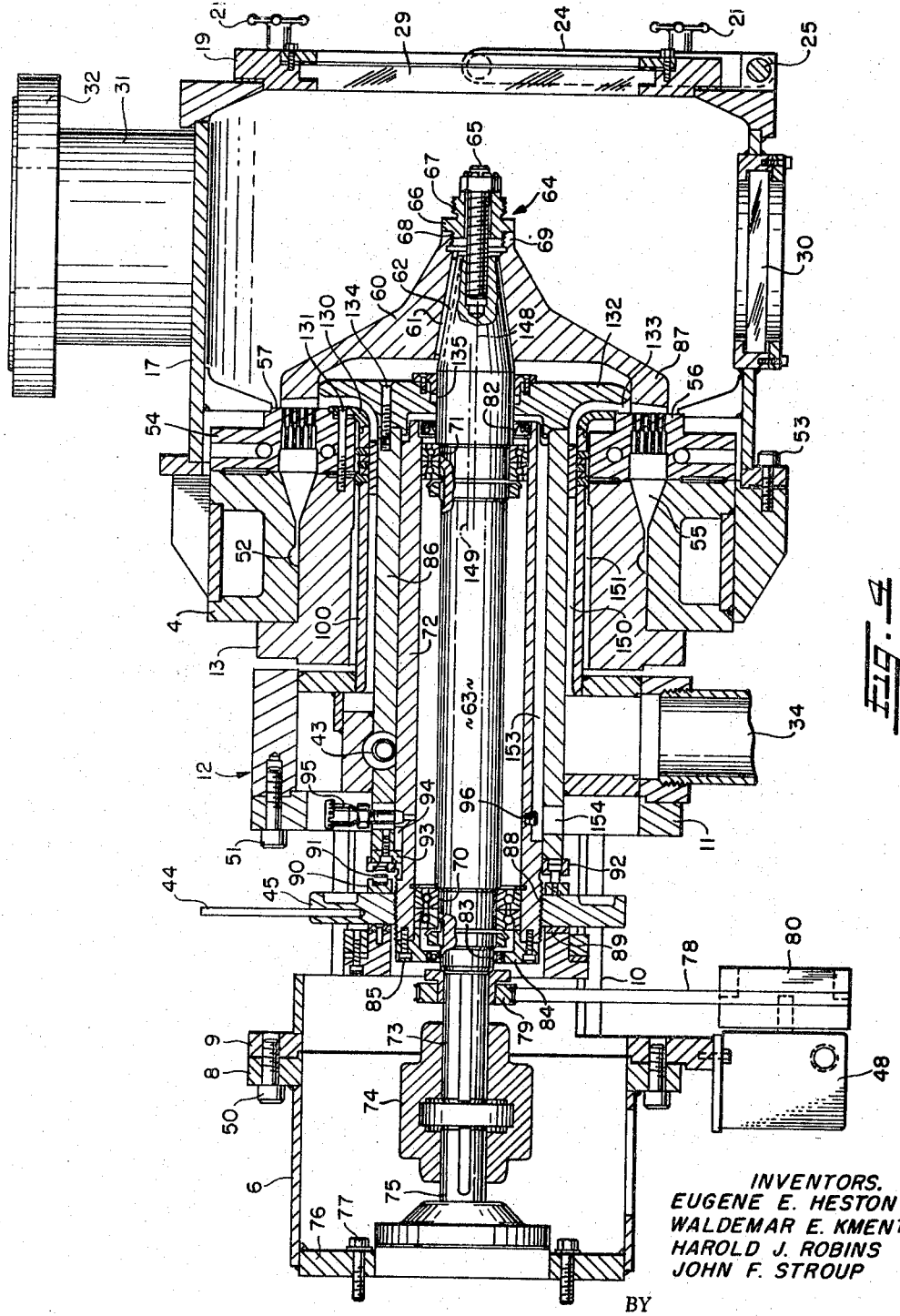

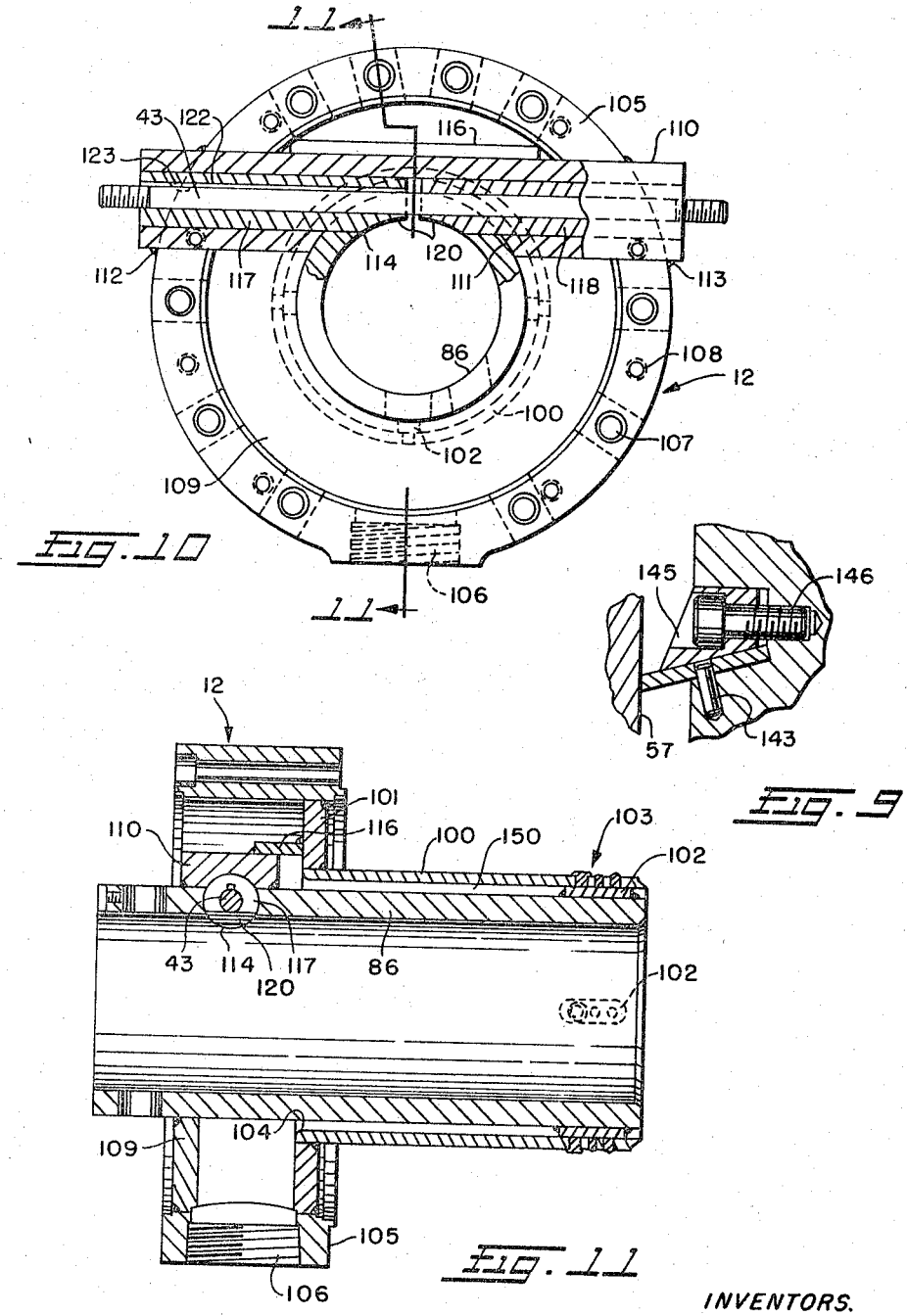

{ # United States Patent Office

3,317,957
PELLETIZER

Eugene E. Heston and Waldemar E. Kmentt, Akron, Harold J. Robins, Medina, and John F. Stroup, Cuyahoga Falls, Ohio, assignors to NRM Corporation, Akron, Ohio, a corporation of Ohio
Filed June 11, 1965, Ser. No. 463,246
20 Claims. (Cl. 18—12)

This invention relates generally as indicated to a pelletizer and more particularly to an underwater pelletizer for converting thermoplastic material to granular form.

For ease of packaging, shipment, mixing, etc., it is desirable to have various plastic material in a pelletized or granular form. This may be accomplished by attaching a pelletizer to the output end of an extruder to cause the extrudate to pass through a plurality of orifices in a rotating die face cutter. The cutter usually rotates over the die face in a liquid bath which will solidify and convey away the formed pellets.

One of the several problems encountered in rotating die face cutters is the need for frequent change of cutter blades. This is an especial problem in underwater pelletizers which usually require that all water connections be removed when changing cutters. Further, as cutters wear, the quality and uniformity of the pellets produced may vary. Heretofore, the operator has often adjusted cutting pressures or clearances as the result of a visual check of the pellets produced. If the cutter blades do not sweep the die face with the proper uniform cutting clearance, pellets of uniform quality and size will not be produced.

Furthermore, the temperature of the flushing liquid which forms the bath into which the pellets are formed and flushed away must be closely controlled at least partially to solidify the pellets when formed and yet not tend to solidify the extrudate prior to its issuance from the die face. Moreover, care must be taken to prevent impingement of the cut pellets against the die face or fresh extrudate which increases the chance of agglomeration. Since the temperature of the liquid can best be controlled at the liquid inlet and not in the relatively large volume housing surrounding the die face cutter, it has been found that improved pellet quality and uniformity can be obtained by conducting the controlled temperature liquid directly to the cutting area and in such manner as to flush the die face away from the cutters to prevent agglomeration. It has further been found that by so directing the liquid, the bearings of the cutter shaft can also be kept at the proper low working temperature.

It is accordingly a principal object of the present invention to provide an underwater pelletizer wherein the liquid inlet is juxtaposed to the cutting area.

Another principal object is the provision of an underwater pelletizer wherein the inlet for the liquid extends axially of and about the housing for the cutter shaft.

A further principal object is the provision of a cutter and liquid inlet assembly for an underwater pelletizer wherein the liquid will sweep the die face and not permit pellets already formed to recross the die face thereby avoiding collision between pellets and the extrudate thus reducing chances of agglomeration.

Another object is the provision of an underwater pelletizer wherein the entire cutter may be quickly and conveniently removed and replaced without disconnecting the liquid piping.

A further object is the provision in a die face cutter pelletizer of a means accurately to adjust the cutter while running and to provide a safety mechanism in such adjustment to avoid undue cutter-die pressures.

Still another object is the provision of an annular introduction of circulating liquid to an underwater pelletizer about the cutter shaft in a manner to maintain properly the temperature of the shaft bearings.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawings:

FIG. 3 is an end elevation of the pelletizer shown in FIGS. 1 and 2 as seen from the right thereof;

FIG. 4 is a fragmentary transverse section of the pelletizer on a slightly enlarged scale taken substantially on the line 4—4 of FIG. 3;

FIG. 5 is an enlarged fragmentary sectional view of the cutter adjustment mechanism seen on a smaller scale in FIG. 4;

FIG. 6 is an end elevation of the cutter hub as seen from the left in FIG. 4;

FIG. 7 is a transverse sectional view of the cutter hub taken substantially on the line 7—7 of FIG. 6;

FIG. 8 is a fragmentary view partly in section of the recess in the cutter hub in which the cutting blades are mounted;

FIG. 9 is a fragmentary sectional view similar to FIG. 8 illustrating the cutter blades mounted in place;

FIG. 10 is an end elevation partly broken away and in section of the liquid inlet annulus sub-assembly of the present invention; and FIG. 11 is a transverse section of such liquid inlet annulus sub-assembly taken substantially on the line 11—11 of FIG. 10.

PELLETIZER—GENERAL ARRANGEMENT

Figure 2:
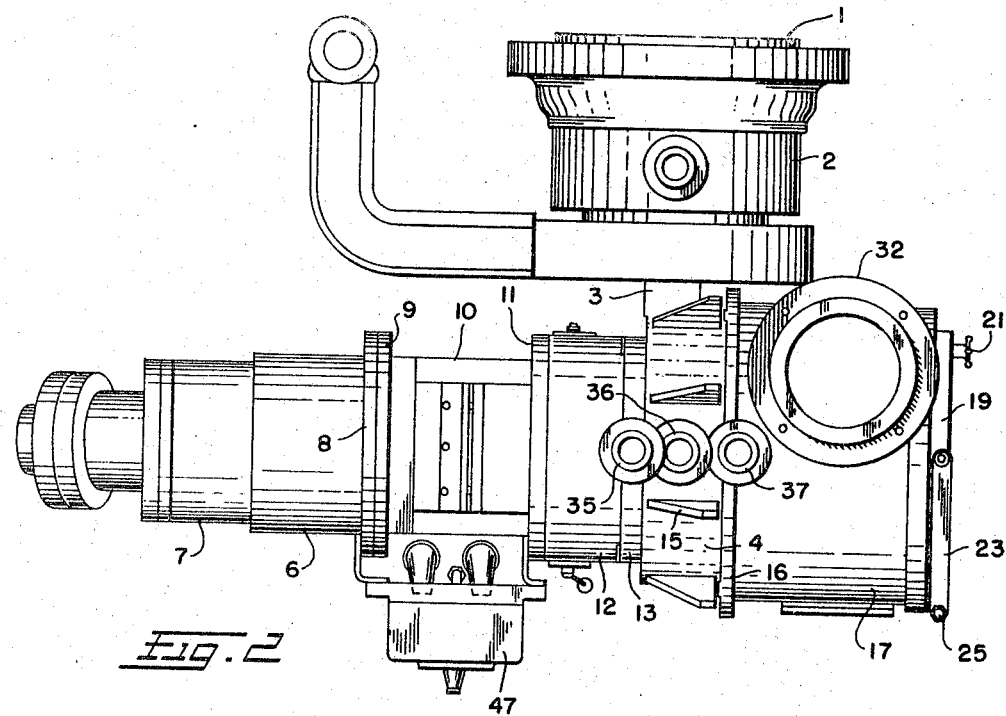
FIG. 2 is a top plan view of the pelletizer shown in FIG. 1.
Figure 1:
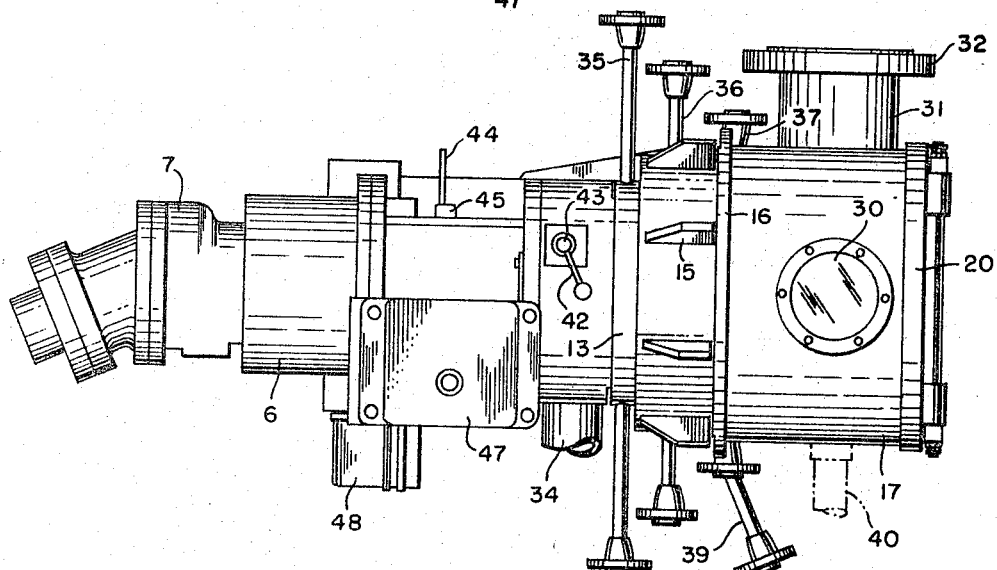
FIG. 1 is a side elevation of an underwater pelletizer in accordance with the present invention.

Referring first to FIGS. 1, 2 and 3, it will be seen that the pelletizer may be attached to the output end of an extruder as at 1 through an adapter 2 which is in turn connected at 3 to the die body 4 of the pelletizer.

The pelletizer may include at its rear or left hand end as seen in FIG. 2 a drive housing 6 to which may be attached a hydraulic drive motor 7 for rotating the cutter shaft. It will, of course, be appreciated that other types of drives may be provided such as electrical D.C. drive motors. The drive housing 6 is provided with a flange 8 secured to flange 9 of support frame 10 which includes an opposite end flange 11 secured to liquid inlet annulus 12. The flange 11 and the annulus 12 may be secured together and both securely fastened to die mandrel 13 cooperating with the die body 4 to form an annular passage for the extrudate entering the pelletizer through the inlet 3.

A plurality of gusset plates 15 are mounted on the die body 4 and such gussets are used to secure flange 16 of water housing 17 to the die body 4. As seen in FIG. 3, the water housing 17 is provided with a front access door 19 which may be clamped to the front of the water housing 20 by the four clamping screws 21 shown at each corner of the door as seen in FIG. 3. The door 19 is centrally vertically pivotally mounted on the distal ends of arms 23 and 24 which are vertically interconnected by hinge pin 25 mounted in vertically spaced knuckles or bearings 26 and 27 on the front 20 of the water housing. The door 19 is provided with an annular central window 29 providing a visual access to the interior of the water housing and a similar but smaller window 30 may be provided on the side of the housing as seen in FIG. 1. A fairly large diameter outlet conduit 31 is mounted on the top of the housing 17 and is provided with a coupling flange 32 so that the outlet may be connected to further conduit to convey the liquid and the pellets entrained therein to a suitable separator.

The liquid or water inlet 34 is provided at the bottom of the annulus 12 and connected to the water housing in a manner which will hereinafter become apparent. Connected to the mandrel 13 and to the die body 4, both top and bottom, are high pressure fluid lines 35 and 36 so that a heating medium such a steam may be circulated through such parts to maintain the extrudate at proper flowable temperature. A similar conduit may be connected, both top and bottom, at 37 to provide a heating medium to the die. The adaptor 2 may also be provided with such top and bottom flanged conduits as shown at 38 and 39 in FIG. 3 with the lower conduit 39 being inclined slightly as shown in FIG. 1. The bottom of the water housing 17 may be provided with a drain conduit shown in phantom lines at 40 in FIG. 1 which may have connected thereto a ball valve and nipple so that the water housing may be drained when desired.

A lever 42 is connected to a locking shaft 43 extending transversely through the pelletizer for the purpose of manually locking the cutter in the position of adjustment obtained by the manipulation of lever 44 extending upwardly from cutter adjusting hand wheel 45. The cutter hand wheel may have an index marked thereon graduated in thousands (.001) so that the operator can closely control the clearance between the cutter and die face. Cutter adjustment may then be obtained by use of the lever 44 and the lever 42 may then be employed to lock the cutter in its position of adjustment.

Mounted on the side of the support frame 10 is a motor control box 47, and beneath such box as seen in FIG. 1 is a tachometer generator 48 driven directly from the cutter shaft which serves not only as part of the speed control circuit, but also as a plugging switch.

GENERAL ASSEMBLY

Referring now more particularly to FIG. 4, it will be seen that suitable fasteners 50 may be employed to hold the flange 8 of the drive housing 6 to the flange 9 and that fasteners 51 may hold the opposite flange 11 of the support frame 10 to the annulus 12. Other fasteners, not shown, may extend from the annulus 12 into the mandrel 13. The mandrel 13 and die body 4 snugly interfit to form an annular passage 52 which is, of course, connected at 3 to the extruder. Connected by fasteners 53 to the peripheral gussets of the die body is the water housing 17 which encloses die 54 secured to the face of the die body and mandrel 13 and cooperating therewith to form the annular flaring passage 55 which communicates with the annular passage 52. The passage 55 terminates in a plurality of annularly arranged small apertures 56. The passages 56 extend through the face 57 of the die 54 into the interior of the water housing 17.

A plurality of cutter blades mounted on the cutter hub 60 sweep that annular portion of the die face 57 through which the annular series of apertures 56 project. The cutter hub 60 is keyed as at 61 to the tapered end 62 of drive shaft 63. The hub is held in place by a retaining collar 64 fitted over threaded stud 65 secured to the end of the shaft 63. The retaining collar includes a flange 66 and a threaded portion 67 with the latter being adapted to fit in the threads 68 inside the annular end 69 of the hub 60. In this manner, the retaining collar in the position shown in FIG. 4 may be used to employ the flange 66 to bear against the annular end 69 of the hub firmly retaining the hub on the tapered portion 62 of the drive shaft. When it is desired to remove the hub, the retaining collar 64 can be reversed with the threads 67 fitting within the threads 68 so that the retaining collar can be used as a jack screw to break the cutter hub loose from the tapered shaft.

The shaft 63 is mounted in spaced bearings 70 and 71 within shaft housing 72. The inboard end of the shaft 73 extends into a sliding shaft coupling 74 which connects the shaft 63 to the drive shaft 75 of the motor which may be held to the plate 76 of the driving housing 6 by suitable fasteners 77. The tachometer generator 48 may be driven by timing belt 78 trained about sheave 79 mounted on the shaft inboard end 73 and about the wide face sheave 80 mounted on the input shaft of the generator 48.

Shaft seals 82 and 83 may be mounted at each end of the shaft or bearing housing 72 with the latter seal being provided on end cap 84 secured by suitable fasteners 85 to the end of the housing 72.

The bearing or shaft housing 72 is mounted for limited axial movement in the interior sleeve or cylinder 86 of the annulus sub-assembly 12. Limited movement of the housing 72, of course, also moves the shaft 63 and thus the cutter hub 60 to control the clearance of the cutter blades mounted on the annular peripheral portion 87 thereof with respect to the die face 57. Axial adjustment of the housing 72 and thus the shaft 63 is obtained by the lever 44 connected to hand wheel 45 which is threaded at 88 on the housing 72. The hand wheel 45 is interposed between annular bearing face 89 and a floating retaining ring 90. The retaining ring 90 is spring-biased by means of a series of peripherally spaced safety springs 91 against the face of the hand wheel 45 thus biasing the hand wheel against the bearing face 89. Since the hand wheel is threaded on the housing 72 in which the shaft 63 is journalled, the axial position of the shaft is then controlled by the adjustment of the hand wheel 45. The safety springs 91 extend between the floating retaining ring 90 and a fixed retaining ring 92.

The bearing housing 72 is prevented from rotating by means of a key 93 secured to the end of the interior cylinder 86 of the annulus 12 fitting in keyway 94. A breather vent 95 mounted on the housing may be removed to open passage for introduction of oil lubricant which in turn may be drained by removing the plug 96. The level of the oil lubricant may be set by an offset overflow plug, similar to the plug 96, but not shown. The vent 95, the drain plug 96 and the offset overflow plug are all in the same transverse plane.

Referring now additionally to FIGS. 10 and 11, it will be seen that the annulus sub-assembly 12 in whch the housing 72 is slidably mounted includes, in addition to the interior cylindrical member 86, an exterior thinner wall cylindrical housing 100 joined at one end to the interior of annular plate 101 and at the opposite end to four quadrant spaced spider support members 102 by the weld construction shown generally at 103. Such weld construction may comprise holes drilled in the cylinder 100 with the plug welds built as shown. The interior rear corner of the tubular member 100 may be rounded slightly as shown at 104 to facilitate fluid flow. An annular hub or ring 105 is secured to the exterior of the plate 101 and is provided with the tapped port 106 to which the fluid inlet conduit 34 is connected. The larger annulus 105 may include apertures 107 for fasteners to secure the annulus to the die mandrel and also tapped apertures 108 for the fasteners shown in FIG. 4.

A plate 109 is welded to the interior of the annulus 105, to the exterior of the inner tubular member 86 and also to cross head 110. The cross head 110 is a square block having a central circular recess 111 saddled over the inner member 86 and extending through and welded to apertures in the outer annulus 105 as shown at 112 and 113. A central transverse aperture 114 extends through the cross head 110 as well as through the inner tubular member 86 and intersects the interior diameter thereof as shown more clearly in FIG. 11. A smaller plate 116 is welded to the top of the cross head within the outer annulus 105 and also to the annular plate 101 so that fluid entering the inlet 106 will be directed axially through the annular elongated cylindrical passage 150.

Mounted within the transverse aperture 114 are two clamping members 117 and 118, the inner ends of which are provided with circular recesses shown at 120. The radius of such recesses may be approximately the same as the radius of the I.D. of the member 86 or the O.D. of the housing 72 which is axially slidable therein. A clamping bolt 43 is mounted in the aligned transverse apertures in the clamping members 117 and 118 and the aperture in the clamping member 117 is provided with a keyway 122. A key 123 mounted in a semi-circular recess in the bolt 43 keeps the bolt from rotating with respect to the clamping members. The clamping bolt 43 is threaded at both ends as indicated in FIG. 10 and on one end there may be provided a lock nut while on the other end is mounted locking lever 42 shown in FIG. 1. It can now be seen that the locking lever when rotated will cause the clamp members to move toward each other to cause the recess 120 to engage and clamp the bearing housing 72 in the position of adjustment obtained by the hand wheel 45.

Referring now back to FIG. 4, it will be seen that the end of the tubular member 100 is provided with a step which seats against an inner shroud member 130 held in place by elongated fasteners 131 extending through the die 54 into the mandrel 13. The inner shroud member 130 cooperates with an outer shroud member 132 to form an annular trumpet-shape passage 133 terminating at the die face 57 justaposed to the cutters and the die face openings for the extrudate. The outer shroud member 133 is secured by fasteners 134 to the end of the inner tubular member 86 of the annulus 12. Such outer shroud member surrounds the shaft 63 and may be provided with a packing as shown at 135.

It can now be seen that the cutter hub shown in detail in FIGS. 6 and 7 acts as a partition or cap cooperating with the outer shroud 132 preventing liquid flow containing the entrained pellets from recirculating or recrossing the die face 57. The cutter hub thus has a recess as indicated at 140 in FIG. 7 and the outer shroud 132 fits quite closely therewithin. The outer portion of the cutter hub 87 includes a plurality of recesses 141 indicated in detail in FIG. 8 in which the cutter blades are mounted in the manner shown in FIG. 9. Such recesses each include a sloping side 142 with an aperture in the face of such side to accommodate dowel pin 143. The bottom of the recesses are provided with tapped apertures 144 so that blade clamps 145 may be secured within the recesses by the fasteners 146. The blades 147 are first positioned within the recesses by means of the locating dowel pins 143 and then the clamping locks 145 are secured in place by the fasteners 146 to clamp and wedge the blades in place. It is noted from FIG. 6 that the recesses and thus the blades clamped therein extend at an angle to a radius of the cutter hub so that the blades will sweep across the die face at a slight cutting angle with respect to the circular path of travel.

As best seen in FIG. 4, the center line 148 of rotation of the shaft 63 and thus the cutters may be offset slightly from the center line 149 of the center of the concentric rings of orifices or passages 56 through the face 57 of the die 54. In this manner, the wear on the cutters is distributed over the length of the cutter blades and not concentrated at certain points. The offset should be at least one-half the radial distance between the circles which go through the centers of the rings of orifices.

*Operation*

It can now be seen that the cross head arrangement incorporated within the annulus 12 permits the circulating liquid, usually water, to be introduced at the rear of the rotating die face cutter and conducted through the cylindrical passage 150 in the forwardly projecting portion of the annulus inside of the mandrel 13 and yet outside of the bearing housing 72. The water is then deflected radially by the trumpet-shape passage 133 formed by the inner and outer shrouds to a position juxtaposed to the cutter and die face. This flushes the liquid radially across the die face to carry the cut pellets into the water housing and then through the outlet conduit 31 to suitable separating mechanisms. The cutter hub 60 forms a partition such that once the liquid has crossed the die face 57, it cannot recross the die face carrying pellets, thus avoiding collisions between pellets and fresh extrudate and reducing the chances of agglomeration.

The annular introduction of the circulating liquid in this manner between the shaft, bearings, and housing, and inside the die mandrel 13 serves to cool the shaft bearings 70 and 71, or at least limit their temperature to near that of the water. An air space 151 and limited mechanical contact between the annulus 12 and the mandrel 13 avoids cooling the mandrel and in this manner maintains the extrudate at the proper temperature.

Cutter hubs including the cutter blades may be replaced as units and such are accessible through the access door 19. The packing 135 may also be replaced when the cutter hub has been removed. This may be accomplished without disturbing any of the service piping since the underwater pelletizer may simply be turned off and the water housing drained through the conduit 40. Accordingly, only the time required to pull and replace the hub packings is all the down-time required. Moreover, the special retaining collar 64 can be reversed from the position shown in FIG. 4 with the thread 67 thereof fitting within the threads 68 inside the cutter hub 60 and when the end of the collar bears against the end of the shaft, the collar will act as a jack screw to break the cutter head loose from the tapered shaft end 62. It is thus apparent that the cutter hub 60 can rapidly be changed and packings replaced if required without disturbing the service piping. Individual cutter blades as shown in FIG. 9 can be replaced upon the hub removed so that the cutters can be removed and replaced as a unit.

The bearing housing 72 is matched to the inside diameter of the inner tubular member 86 of the water inlet annulus 12 with a close sliding fit such that it, the shaft 63, and thus the cutter head 60 may be axially adjusted while running by means of turning the hand wheel 45.

At full "out," the cutters are moved away from the die face until the bearing housing seats against the inner end of the shroud 132. During the inward adjustment, the blades approach the die face 57 and when the blades contact such face, the safety springs 91 are compressed by further turning of the hand wheel 45. When the springs 91 are compressed, the hand wheel 45 moves away from the bearing face 89. This, of course, becomes apparent to the operator indicating that the blades are against the die face. Calibrations on the periphery of the hand wheel may be employed to indicate axial movement in thousands (.001) of an inch, but such calibrations are, of course, meaningful only when the hand wheel 45 is against the bearing face 89 and the blades are not in contact with the die face. Accordingly, the clearance of the blades in thousands of an inch may closely be controlled. The bearing housing 72 may be locked in any set position by the locking lever 42 and clamping bolt 43 when, of course, such locking lever must be released before the hand wheel may be employed to adjust axially the blade. It is noted that the slide-type coupling 74 permits the shaft 63 and thus the blades to be moved in the above-described manner.

The pelletizer is provided with water and oil seals which are so arranged that a leak through either is directed through a keyway 153 cut in the bottom of the bearing housing 72 and then through hole 154 to atmosphere as seen in FIG. 4. In this manner, the type of leakage can identify whether the seal 82 or the packing 135 is at fault.

It can now be seen that there is provided an underwater pelletizer wherein the water or liquid inlet is juxtaposed to the cutting area with the inlet extending axially of and about the housing for the cutter shaft. Moreover, the trumpet-shape inlet juxtaposed to the die face and cutters cooperates with the cutter hub to prevent already formed pellets from recrossing the die face. Moreover, it can be seen that down-time for cutter and seal changes is enabled to be held at a minimum with the construction shown and the cutter clearance can closely be controlled while running and the operator is provided with a visual indication of the clearance and of blade contact with the die face. The safety springs 91, of course, prevent undue blade-die face pressures.

Other modes of applying the principle of the invention may be employed, change being made as regards the details described, provided the features stated in any of the following claims or the equivalent of such be employed.

We, therefore, particularly point out and distinctly claim as our invention:

1. An underwater pelletizer for converting extrudate to granular form comprising a water housing, an annular die face having a plurality of apertures therein through which such extrudate passes into said water housing, a rotating cutter for cutting such extrudate into pellets, a shaft on which said cutter is mounted extending coaxially within said die face, and an annular inlet water passage for said housing extending axially through said die face about said shaft and terminating in an annular opening juxtaposed to the rotating cutter and die face.

2. A pelletizer as set forth in claim 1 including axially spaced bearings for said shaft, a cylindrical bearing housing surrounding said shaft within said inlet passage, and means axially to adjust said housing and thus said shaft to control the spacing of the cutter from said die face.

3. A pelletizer as set forth in claim 2 wherein said last mentioned means comprises a hand wheel threaded on said cylindrical housing and adapted to bear against a fixed bearing face.

4. A pelletizer as set forth in claim 3 wherein said hand wheel is interposed between said fixed bearing face on one side and a spring loaded retaining ring on the other.

5. An underwater pelletizer as set forth in claim 1 including a hub for said rotating cutter forming a partition within said water housing operative to prevent water entering said housing through said inlet passage from recrossing said annular die face.

6. An underwater pelletizer as set forth in claim 1 including annular extrudate passage means to convey extrudate to said die face, said annular inlet water passage being formed by an annulus mounted within said annular extrudate passage means coaxially to convey such water therewithin, and shroud means connected to said annulus to provide a radial annular opening juxtaposed to the cutter and die face.

7. An underwater pelletizer for converting extrudate to granular form comprising a water housing, an annular die face having a plurality of apertures therein through which such extrudate passes into said water housing, a rotating cutter for cutting such extrudate into pellets, and a trumpet-shape water inlet passage for said housing having a radially extending annular opening within and juxtaposed to said rotating cutter.

8. An underwater pelletizer as set forth in claim 7 including a cutter hub for said rotating cutter operative to partition said water housing whereby water entering the housing cannot recross the rotating cutter.

9. A die face cutter for converting extrudate to granular form comprising an annular die face having a plurality of apertures therein through which such extrudate passes, a rotating cutter for cutting such extrudate into pellets, a shaft on which said cutter is mounted extending coaxially within said die face, axially spaced bearings for said shaft, a cylindrical bearing housing surrounding said shaft, and means axially to adjust said housing and thus said shaft to control the spacing of the cutter from said die face.

10. A die face cutter as set forth in claim 9 wherein said last mentioned means comprises a hand wheel threaded on said housing adapted to bear against a fixed bearing face.

11. A die face cutter as set forth in claim 10 wherein said hand wheel is interposed between said bearing face and a spring loaded retaining ring.

12. A die face cutter as set forth in claim 9 wherein said rotating cutter includes a hub mounted on a tapered end portion of said shaft, and collar means operative in one position to hold said cutter hub on said shaft and in an inverted position to break said cutter hub loose from said shaft.

13. A submerged pelletizer for converting extrudate into granular form comprising an annular die face through which such extrudate passes, a rotating cutter operatively opposed to said die face operative to sever such extrudate, and an annular fluid nozzle radially subjacent said die face and cutter operative to pass fluid radially across said die face beneath said cutter.

14. A submerged pelletizer as set forth in claim 13 including partition means operative to prevent fluid exuding from said nozzle from recrossing said die face.

15. A submerged pelletizer as set forth in claim 13 including a trumpet-shape fluid inlet passage which terminates in said annular fluid nozzle.

16. An underwater pelletizer for converting extrudate into granular form comprising a water housing, a die face having a plurality of apertures therein through which such extrudate passes into said water housing, a rotating cutter for cutting such extrudate into pellets, said rotating cutter including a cup-shape cutter hub forming a partition within said water housing, and means to supply water to said housing beneath said cup-shape cutter hub whereby water will flow radially across said rotating cutter to flush pellets from said die face without severed pellets recrossing said rotating cutter.

17. An underwater pelletizer as set forth in claim 16 wherein said cup-shape hub is mounted on a shaft extending axially through said die.

18. An underwater pelletizer as set forth in claim 17 including a fluid inlet to the interior of said cup-shape cutter hub extending about and axially of said shaft.

19. An underwater pelletizer as set forth in claim 16 including, a shaft extending coaxially within said die face, said hub including a plurality of peripherally arranged cutter blades, means removably mounting said hub on said shaft, and means removably mounting said blades on said hub, whereby said blades are replaceable as a unit.

20. An underwater pelletizer as set forth in claim 19 wherein said apertures in said die face are circularly arranged, and said shaft is eccentrically disposed with respect to said circularly arranged apertures.

References Cited by the Examiner

UNITED STATES PATENTS

| | | | |
|---|---|---|---|
| 2,705,927 | 4/1955 | Graves et al. | 18—12 XR |
| 3,029,466 | 4/1962 | Guill | 18—12 XR |
| 3,230,582 | 1/1966 | Hoffman et al. | 18—12 |

WILLIAM J. STEPHENSON, *Primary Examiner.*